United States Patent [19]

Kuhl

[11] Patent Number: 4,564,409

[45] Date of Patent: Jan. 14, 1986

[54] PLANAR CARD MADE OF A THERMOPLASTIC MATERIAL HAVING VISUALLY RECOGNIZABLE SAFETY MARKINGS AND METHOD OF MANUFACTURING SUCH CARD

[75] Inventor: Adolf Kuhl, Oberrieden, Switzerland

[73] Assignee: Orell Fussli Graphische Betriebe AG, Zurich, Switzerland

[21] Appl. No.: 690,511

[22] Filed: Jan. 10, 1985

Related U.S. Application Data

[62] Division of Ser. No. 350,540, Feb. 19, 1982, Pat. No. 4,506,916.

[30] Foreign Application Priority Data

Mar. 3, 1981 [CH] Switzerland ........................ 1421/81

[51] Int. Cl.[4] ...................... B32B 31/00; B29C 65/00; B28B 11/08; F16L 7/00

[52] U.S. Cl. .................................... 156/219; 156/277; 156/293; 156/304.5; 264/263; 264/274; 264/293; 428/162; 428/916; 283/94; 283/904; 40/625

[58] Field of Search ............... 156/219, 228, 245, 246, 156/277, 293, 298, 304.5; 264/263, 274, 293, 297.4, 544, 509, 239; 428/161, 162, 167, 172, 176, 179, 916; 283/74, 904, 94, 111, 98, 91, 72, 75, 76, 77, 108, 113; 40/2 R, 625, 626, 628, 629

[56] References Cited

U.S. PATENT DOCUMENTS

| | | | |
|---|---|---|---|
| 3,412,493 | 11/1968 | French . | |
| 3,604,901 | 9/1971 | Morita | 235/61.12 R |
| 3,753,970 | 9/1973 | Annenberg . | |
| 3,814,904 | 6/1974 | Russell et al. | 235/61.11 E |
| 3,930,924 | 1/1976 | Oka | 156/277 |
| 4,033,059 | 7/1977 | Hutton et al. | 428/916 |
| 4,109,047 | 8/1978 | Fredrickson | 428/916 |
| 4,124,947 | 11/1978 | Kuhl | 283/91 |
| 4,184,700 | 1/1980 | Greenaway | 283/91 |
| 4,184,701 | 1/1980 | Franklin et al. | 40/2 R |
| 4,250,217 | 2/1981 | Greenaway | 428/161 |
| 4,298,217 | 11/1981 | Moraw et al. . | |
| 4,307,899 | 12/1981 | Hoppe . | |
| 4,324,421 | 4/1982 | Moraw et al. | 428/916 |
| 4,356,052 | 10/1982 | Moraw et al. | 156/219 |
| 4,417,784 | 11/1983 | Knop et al. | 428/916 |

FOREIGN PATENT DOCUMENTS

| | | | |
|---|---|---|---|
| EP-31525 | 12/1980 | European Pat. Off. | 428/916 |

*Primary Examiner*—Edward Kimlin
*Assistant Examiner*—Louis Falasco
*Attorney, Agent, or Firm*—Ladas & Parry

[57] ABSTRACT

In order to form safety markings at a planar card made of a plastics material, which card may be used, for instance, as credit card, this card is built up from at least two parts. The inner border area between these two parts comprises a relief-like structure which is the carrier of the safety marking. In order to generate a watermark-like effect the upper part is made of a opaque plastic material and the other part is made of a transparent plastics material. When viewing through this card the areas of the opaque layer having the largest thickness appear as darker areas, whereby when viewing the same way the areas having a smaller thickness show a certain brightness. After being embossed the two parts of the thermoplastic material are joined to each other such that they cannot be separated such that no access from the outside is possible to this safety marking. Accordingly, an additional safety factor is arrived at in cards which can be used as money substrate, identification means or a license for any kind of access.

5 Claims, 11 Drawing Figures

FIG. 7a
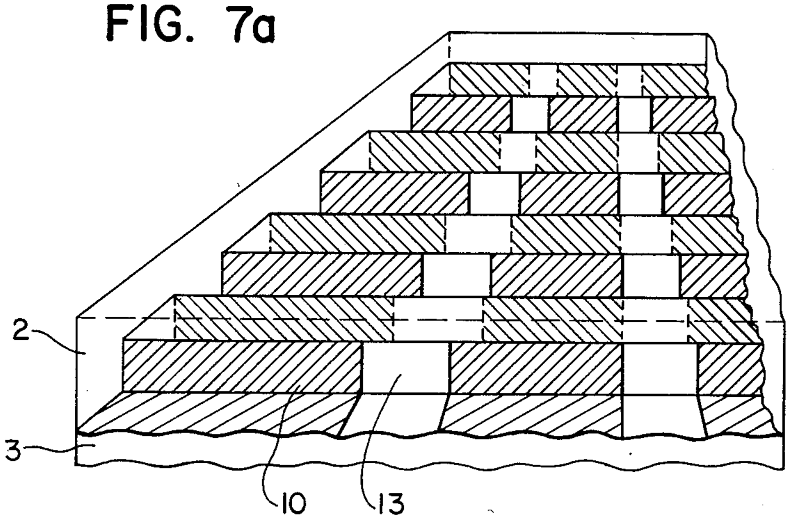
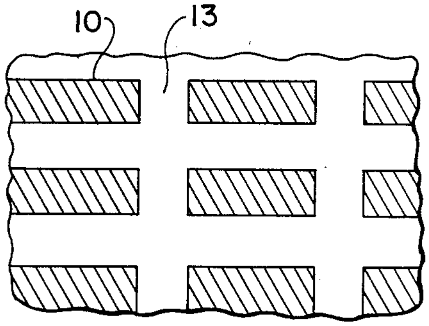
FIG. 7b

PLANAR CARD MADE OF A THERMOPLASTIC MATERIAL HAVING VISUALLY RECOGNIZABLE SAFETY MARKINGS AND METHOD OF MANUFACTURING SUCH CARD

This is a division of co-pending application Ser. No. 350,540 filed on Feb. 19, 1982, now U.S. Pat. No. 4,506,916.

BACKGROUND OF THE INVENTION

1. Field of the Invention

The present invention relates to a card made of a thermoplastic material and having visually recognizable safety markings. The invention relates also to a method of manufacturing a card made of a thermoplastic material and having visually recognizable safety markings.

2. Description of the Prior Art

Recently, printed cards made of a plastics material have been widely accepted as credit cards, as money substrate and also as identification cards, which cards can convey a service, a value or an authorization of access. The partial information which identifies the owner of such card as well as the features, which subordinate such card under a certain organization or system is made in form of printings, embossments, punchings or in form of a magnet-, laser- or holographic information on this card. It is thereby relatively simple to copy the outer appearance of such card. It is obvious that accordingly there exists the possibility of a misuse of such cards which replace the longer the more cash transactions, which copying can be made presently without large efforts. Thereby specifically the public has no possibility to ascertain by itself if such card is genuine. Accordingly, cards have been developed and are known which are compound cards having a paper layer enclosed between two plastic layers. The paper layer is provided with a safety printing such as is known in common paper money and comprises such as is the well known case in paper money a watermark which is visible when a person views through the card. Furthermore, parts of the surfaces of the plastic may be provided with a printed pattern. Such cards do provide indeed a higher safety, however have several shortcomings. It has been proven that due to the compound consisting of different materials such as paper and plastic the embossments of the final card will generate a deformation. Due to the tension force exerted on the card it will show an arching or convexity in direction of the embossing, which detrimentally influences the automatic legibility of the above mentioned information in case such information is present thereon. Furthermore, the construction of such known card allows still an illegal intervention thereof. For this reason it is possible to open the card along the paper layer which allows, say, manipulation of this paper layer or it is possible to dissolve the protecting plastic layers by means of a solvent such that thereafter the paper layer is freely accessible. It is now due to above reasons not desired to have such cards made out of a paper-plastic compound. In contrast, it is desired to provide cards made completely out of a plastics material which comprise the necessary safety features. Because, however, such cards preferably have planar surfaces, no design thereof has been known until now which contains adequate safety features such as are, for instance, known to be present in modern bills with paper money which measures presupposed often irregular surface structures. Furthermore, there exist no cards made of a plastics material which have safety features which are visible by viewing through such card, which do not have other significant drawbacks.

SUMMARY OF THE INVENTION

Hence, it is a general object of the present invention to provide an improved construction of a card which comprises visually recognizable safety features without comprising, however, the drawbacks of mentioned known cards.

A further object of the invention is to provide a card made of a thermoplastic material and having visually recognizable safety markings, which card comprises at least two parts placed upon each other, of which at least one consists of a transparent thermoplastic material whereby the inner border area between the two parts comprises a relief-like structure which is given such a shape that upon a suitable viewing at least one safety marking is visually detectable. A further object is to provide a method of manufacturing a card made of a thermoplastics material and having visually recognizable safety markings, having further at least two parts placed upon each other, of which at least one consists of a transparent thermoplastic material whereby the inner border area between said two parts comprises a relief-like structure which is given such a shape that upon a suitable viewing at least one safety marking is visually detectable, which method comprises the steps of embossing by means of an embossing mold a one-sided relief into a first section of a thermoplastic mass; of embossing by means of a correspondingly complementary shaped second embossing mold a one-sided, complementary shaped relief into a second section of a thermoplastic mass; and of joining said two sections having said embossed surfaces nonseparably together.

Two specifically preferred embodiments are under consideration. According to one embodiment the safety marking is preferably viewable when viewing through the card which is arrived at in that one of the two parts consists of an opaque and the other of a transparent thermoplastic material whereby the relief-like structure extends such that in certain areas defining a safety marking the opaque part comprises a locally varying thickness.

The other embodiment is such, that such safety marking is preferably recognizable at the top view of the card, however, at a suitable viewing angle to which end at least one zone or area of the relief-like structure at the inner border area comprises a line-screen raster-like wave shape, whereby such border area is provided with a printed pattern such that the visual appearance thereof changes along with a change of the viewing angle thereof.

BRIEF DESCRIPTION OF THE DRAWINGS

The present invention will be more fully understood by reference to the following detailed description thereof when read in conjunction with the attached drawings, and wherein.

Figure 1:
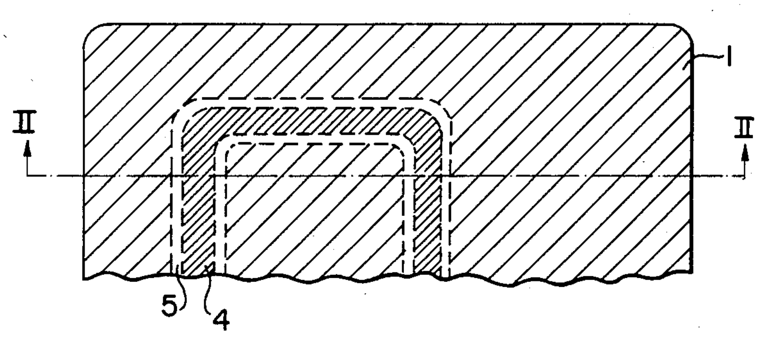
FIG. 1 is a view of a part of a card according to a first embodiment when viewed from above, i.e. when viewed through the card.
Figure 3:
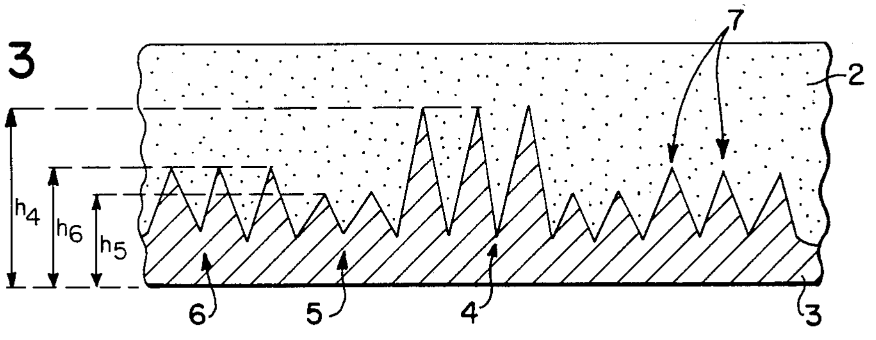
Figure 4:
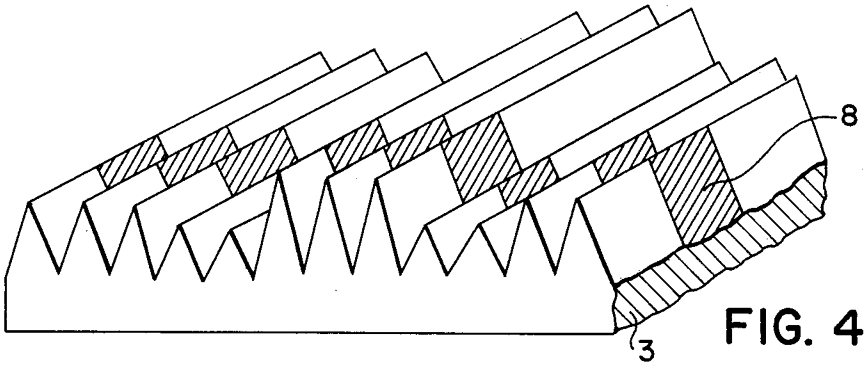
Figure 5A:
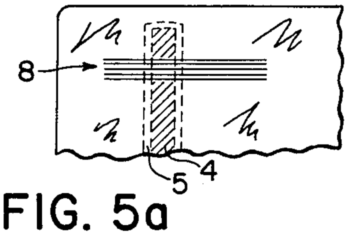
Figure 5B:
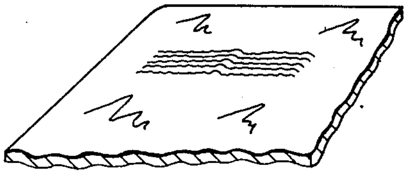
Figure 6A:
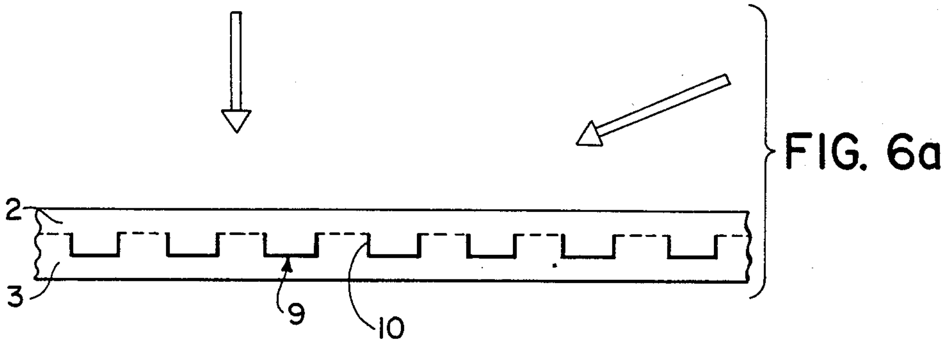
Figure 6B:
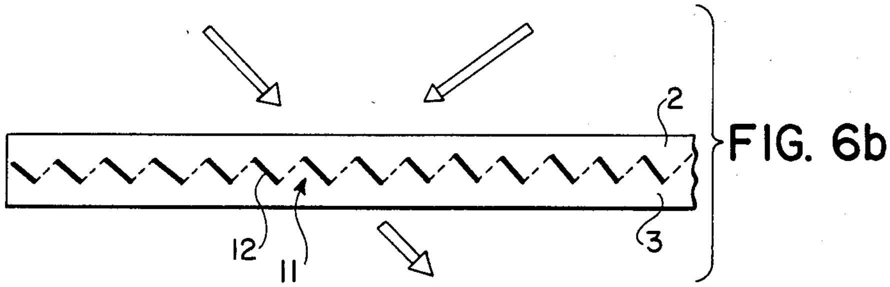

FIG. *2a* is a schematically enlarged view of a section along line II—II of FIG. 1;

FIG. *2b* is a view corresponding to the view of FIG. *2a* whereby the two parts are shown prior to their joining together;

FIG. 3 is a view of a schematically enlarged section of a further embodiment of the card shown in FIG. 1;

FIG. 4 is a perspective view at an enlarged scale of a printed part having a wave shaped relief structure;

FIGS. 5*a* and 5*b* is a top view each of a card, however viewed at different angles, whereby the card is composed of the parts according to FIG. 4;

FIGS. 6*a* and 6*b* are schematic views of sections on an enlarged scale of two further embodiments of the invention; and FIGS. 7*a* and 7*b* is a top view each, shown again on an enlarged scale of a further variant of the embodiments according to FIG. 6, whereby again different viewing angles are embodied.

DETAILED DESCRIPTION OF THE PREFERRED EMBODIMENTS

Although the following description refers to the already mentioned various embodiment of which one refers to a marking when viewing through the card and the other to a marking when simply the card from above are shown separately from each other, it must be mentioned that this separate description of those two procedures is for clarity's sake only and that both embodiments are foreseen to be preferably and advantageously combined such as is schematically shown in FIG. 5.

Figure 2B:
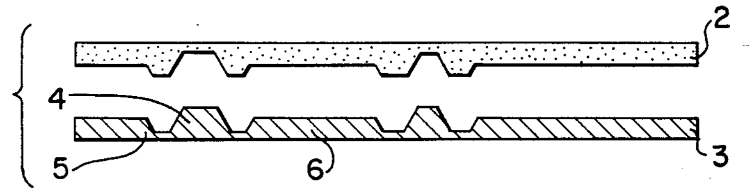
Figure 2A:
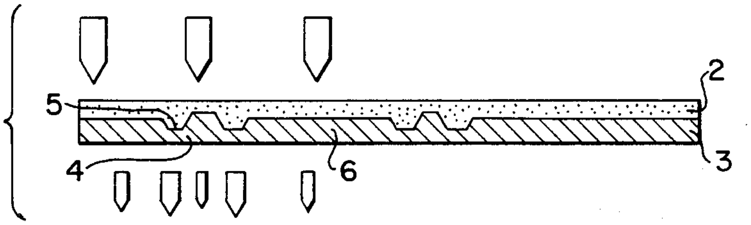

Firstly, now those embodiments will be described which allow a marking or identification, respectively, when viewing through the card. In FIG. 1 a section of such a card 1 is shown when viewed directly from above whereby presupposed that a light source is arranged behind the card. Thereby two zones are recognizable and defined against the balance of the lighted picture of the card, which two zones may smoothly run into each other. A dark zone 4 and a light zone 5 bordering former zone 4 can be recognized. This corresponds to the well known appearance of a watermark in paper, which watermark is made in that paper fibers are concentrated on certain predetermined locations whereby the areas immediately adjacent to locations of less fibers in that fibers are withdrawn therefrom which leads to the bordering brighter zones. These varying concentrations of fibers lead now to a varying transparency to light, which variation is the reason for the described effect. In a card in accordance with the invention which shall have no paper inserted and which shall be made completely out of a plastics material the mentioned watermark cannot be made according to the above mentioned procedure. To this end a card is made from two half parts or portions, respectively, 2, 3 such as shown in FIGS. 2*a* and *b*. One half portion 2 consists of a transparent plastic material and the other half portion 3 consists of an opaque plastic material, i.e. a plastic material which is translucent, can be permeated by light but is, however, turbid. Such material has a higher light absorbing coefficient $\beta$, such that light will be substantially weakened when penetrating a relatively thin layer of about 0.4 mm of such material. Now use is made of the fact, that an absorption of light depends on the distance through which the light has traveled, this according to the equation $$I=I_o \cdot e^{-\beta S},$$

whereby $I_o$: incoming light intensity

I: Light intensity after passing distance S $\beta$: Light absorbing coefficient.

Accordingly, a larger thickness of the layer leads to a higher absorbing of light. The influence of the transparent half portion 2 is negigible, because its light absorbing coefficient $\beta$ is extremely small in comparison with such of the opaque layer. The opaque half portion 3 is now shaped such, that in order to shape watermark-like effects zones 4 are shaped which an increased thickness. In the zones 5 immediately adjacent the zones 4 there will be formed zones having a smaller thickness such that when viewing through the card, i.e. specifically through the half portion 3 a brighter zone 5 exists around the darker appearing zones such which is a characterizing feature at common watermarks. In FIG. 2*b* this is shown schematically by means of arrows which at the one hand represent the incoming light and at the other hand represent the light penetrating the layer whereby the thickness of the arrows represents the light intensity. The embossing of the relief in the opaque half portion 3 proceeds such, that the total amount of the material remains the same and that only a shifting of masses of material out of the zones 5 and into the zones 4 takes place. This leads to the fact, that the mean thickness measured over the zones 4 and 5 having mentioned relief like structure is the same as the thickness of the rest of the card. Such forming is made by means of an embossing tool of known design. The transparent half portion 2 is now provided with a corresponding embossment whereby the embossing tool used hereto is electrolytically formed off the first mentioned embossing tool. Thereafter, the two half portions are bonded together by a laminating to an integral homogeneous part such that they cannot be separated from each other. Along the border area provided with the relief like structure of the two half portions a polymerization of the molecules of the plastic materials takes place such that a molecular binding is formed which obviously cannot be separated. It is obvious, that also a graphical pattern may be printed onto the inner bordering areas in case such is desired. This will be more closely entered into when referring to further embodiments. The surfaces of a card 1 made in accordance with the above description are planar surfaces and may be printed or covered according to known procedures. The characteristic marking of the card is thereby enclosed inside of the card and no access thereto is possible. Thereby, this marking is normally not recognizable at a viewing of the card from the top because the differences of thickness as such are not recognizable at a top view. This makes it now still more difficult to imitate such marking by a corresponding misleading or deceiving, respectively, color print as is sometimes tried with paper having common watermarks in which as is known a small contrast of color is also discernible in a top view thereof.

In FIG. 3 a preferred embodiment of the explained principle is shown schematically in section and on an enlarged scale. In order to shape the relief-like structure of the border area use is made of the screen raster technique. In those zones 4 which shall be darker when viewed through the card the height $h_4$ of the individual point-like picture of screen elements is chosen to be larger than the height $h_6$ of the picture screen elements in the main area of the card. In contrast thereto the height $h_5$ of adjoining zones 5 is kept smaller. Decisive for the light permeability is the thickness of the opaque half portion 3 whereby the mean thickness across the individual zones is measured in case the individual screen points cannot be dissolved or not completely dissolved visually. These mean thicknesses are now chosen such that the effect mentioned already in connection with FIGS. 1 and 2 is visible when viewing through the card. Again the embossing leads only to a shifting of material out of the brighter areas 5 and into the darker areas 4. This shaping of the reliefs in form of a screen raster allows a simple shifting of these material masses and, additionally, increases the border area along which the two half portions of the card are joined together such that an increased adherence of the integral card made of the two half portions is arrived at. The transparent half portion 2 is again complementary shaped.

The relief shaped border area which is made by means of the above explained procedure inside of the card 1 may also be used to identify the card when viewing it simply from the top. If such is coupled with an identification mark which is only recognizable when looking through the card, the one half portion is still to be made of a transparent plastic material and the other from an opaque thermoplastic material.

An embodiment in which this procedure is shown is depicted in FIGS. 4 and 5. In FIG. 4 there is shown a line shaped relief structure arranged at the opaque half portion 3 whereby a corresponding shaping can be seen in its middle section which corresponds to the one shown in FIG. 3. This structure is now printed by a color band 8, which when viewed perpendicularly from above, extends rectilinearly. The opaque half portion 3 manufactured accordingly is mated with a complementary shaped transparent half portion (not particularly shown) to a card of which a section is schematically shown in FIG. 5. In FIG. 5*a* the appearance of the card is shown when viewed or looked, respectively, through the card. The rectilinearly extending line pattern 8 is recognizable as well as the zones 4 and 5 shaping the watermark. If the card is viewed at an acute angle such as is shown in FIG. 5*b*, the line pattern appears to be slightly wave shaped and the watermark disappeared. If viewing the card at an acute angle and more exactly, it is possible to recognize this watermark based on the higher amplitude of the waves of the line pattern 8. This combination of viewing through and top view identification increases the difficulty when counterfeiting such cards and accordingly increases their safety.

Finally a further embodiment of the invention is shown in FIG. 6 and 7 which allows an identification in the top view as well as in the through view. In FIGS. 6*a* and *b* two variants of this embodiment are shown in section. The border area between the two half portions 2 and 3 comprises each a linearly extending raster screen-like relief structure. Such will be provided on one of the half portions with a printed pattern which in top view changes depending on the viewing angle (FIG. 6*a*) or which, respectively, leads, when viewing through the card depending on the angle of view, to a changing impression of brightness (FIG. 6*b*). The first named variant is based on a relief structure which comprises at least roughly a square shape 9. The side flanks as well as the bottoms of the valleys are provided thereby with a color layer 10 whereagainst the crests or peaks, respectively, have no coloring. When viewed perpendicularly from above the colored areas 10 are basically recognizable as lines and when viewed at an acute angle from above, they will complement each other to a continuous colored area. If colors are used with a small translucity for light, one can recognize when viewing through the card depending on the viewing angle various brightnesses. Accordingly when viewing the embodiment of FIG. 6*a* perpendicularly from above a higher brightness is recognized as when viewing it at a slanted angle. In the embodiment according to FIG. 6*b* the relief structure as seen in section has a triangular shape 11. One flank 12 is provided with a color layer 12 and the other flank has no color layer. Again, depending on the viewing angle a changing appearance of the printed pattern is visible, which appearance changes from a simple line pattern (arrow at the left hand side of FIG. 6*b*) to a continuous color area (arrow at the right hand side of FIG. 6*b*). When viewing through the card the recognizable brightness is asymmetrical in case a color is used having a small light permeability. If the card is turned to the side beginning from a perpendicular orientation thereof, the brightness increases, and if the card is turned to the other side, the brightness decreases.

The mentioned embodiments can obviously be made further such that in addition a watermark appears when viewing through such card, such as mentioned above based on FIGS. 1 to 4. Furthermore, it is possible to add further safety features such as shown, for instance, in FIGS. 7*a* and *b*. This embodiment of the arrangement in accordance with FIG. 6*a* comprises a corresponding printing pattern which, however, is provided with gaps 13, which are arranged in line in certain directions. In the top view (FIG. 7*b*) this is not recognizable because this structure is an extremely fine structure. If, however, viewed at an extremely flat angle (FIG. 7*a*) bright alleys are clearly visible in a dark background. This effect is basically known from paper money, from bills whereby however an unplanar surface is presupposed and such can be used such as explained above without any further ado as an additional safety feature in planar plastic cards.

It is quite obvious that the planar surfaces of such plastic cards can be printed in a known way. In order to use the above mentioned features which must be viewed from the top, at a certain angle etc. the corresponding areas on the card must be provided with windows. Furthermore, parts of the information of the card itself may also be located at the printed pattern in the border area.

The described arrangement having a relief-like shape border area which may additionally be provided with a printed pattern and which extends between two card portions which are connected such that they can no longer be separated allows, as described above, many advantageous possibilities of a visual security measure of such cards which until now has not been achieved or possible. Thereby absolutely planar surfaces are maintained. Embossments in the card do not lead to an arching or convexing thereof such as is known by known compound cards. An access to the safety features for counterfeiting purposes is not possible.

A specifically advantageous use of a marking which can be recognized when viewing through the card by utilization of a relief shaped structure at the bordering area between the opaque portion 3 and the transparent portion 2 according to FIGS. 1 to 3 is to shape the relief structure in accordance with the portrait, a photographic picture of the card owner. When viewing through the card this portrait, photo of the owner appears in a watermark-like form and can be compared at any time with a real photograph of the owner or obviously with the owner himself. Accordingly, it is possible to have a further and individual recognition feature. This is specifically possible due to the fact, that the relief-like structure of the bordering area can have areas of varying thickness which flow smoothly into each other, which—contrary to the common watermarks, which usually are provided with just two brightness steps—provide when viewing through the card a picture with smooth variations of brightness between a maximum and a minimum.

While there are shown and described present preferred embodiments of the invention, it is to be distinctly understood that the invention is not limited thereto, but may be otherwise variously embodied and practiced within the scope of the following claims.

What is claimed is:

1. A method of manufacturing a card of a thermoplastic material having planar surfaces and visually recognizable, internal safety markings comprising the steps of embossing a relief structure into an inner surface of a first sheet of transparent thermoplastic material by means of a first embossing mold; embossing a complementary relief structure into an inner surface of a second sheet of opaque thermoplastic material by means of a second embossing mold complementary to the first embossing mold; and laminating said first and second sheets upon each other with their inner surfaces contacting each other to to form an interface, and thereby providing an inseparable body with planar surfaces and an inner relief, whereby though said card said relief structure is visually recognizable as a varying brightness due to varying light absorption of the transmitted light in the opaque sheet.

2. The method of claim 1, wherein said embossing molds have first zones projecting from the plane of the molds and second zones recessed into the plane of the molds such that embossing is made by shifting thermoplastic sheet material transversely from said first to said second zones without changing mean thickness of the sheets.

3. The method of claim 2, wherein each of said first zones is immediately adjacent to one of said second zones.

4. The method of claim 2, wherein said first and said second zones flow smoothly into each other.

5. The method of claim 1, wherein one of said first or second embossing molds is electrolytically formed from the other complementary mold.

* * * * *